(12) United States Patent
Belgard

(10) Patent No.: US 6,813,699 B1
(45) Date of Patent: Nov. 2, 2004

(54) SPECULATIVE ADDRESS TRANSLATION FOR PROCESSOR USING SEGMENTATION AND OPTIONAL PAGING

(75) Inventor: Richard Belgard, Saratoga, CA (US)

(73) Assignee: Transmeta Corporation, Santa Clara, CA (US)

( * ) Notice: Subject to any disclaimer, the term of this patent is extended or adjusted under 35 U.S.C. 154(b) by 0 days.

(21) Appl. No.: 10/166,432

(22) Filed: Jun. 10, 2002

Related U.S. Application Data

(63) Continuation of application No. 09/757,439, filed on Jan. 10, 2001, now Pat. No. 6,430,668, which is a continuation of application No. 08/905,356, filed on Aug. 4, 1997, now Pat. No. 6,226,733, which is a continuation of application No. 08/458,479, filed on Jun. 2, 1995, now Pat. No. 5,895,503.

(51) Int. Cl.$^7$ .............................................. G06F 12/02
(52) U.S. Cl. ....................... 711/213; 711/203; 711/204; 711/205; 711/206; 711/207; 711/209; 711/220
(58) Field of Search ................................. 711/203, 204, 711/205, 206, 207, 209, 213, 220

(56) References Cited

U.S. PATENT DOCUMENTS

| | | | |
|---|---|---|---|
| 4,084,225 A | | 4/1978 | Anderson et al. |
| 4,400,774 A | | 8/1983 | Toy |
| 5,165,028 A | | 11/1992 | Zulian |
| 5,321,836 A | * | 6/1994 | Crawford et al. ........... 711/206 |
| 5,335,333 A | | 8/1994 | Hinton et al. |
| 5,423,014 A | | 6/1995 | Hinton et al. |
| 5,895,503 A | * | 4/1999 | Belgard ...................... 711/202 |
| 5,900,022 A | * | 5/1999 | Kranich ...................... 711/205 |
| 5,960,466 A | * | 9/1999 | Belgard ...................... 711/213 |
| 5,961,580 A | * | 10/1999 | Mahalingaiah .............. 708/670 |
| 6,226,733 B1 | * | 5/2001 | Belgard ...................... 711/213 |
| 6,430,668 B2 | * | 8/2002 | Belgard ...................... 711/202 |

FOREIGN PATENT DOCUMENTS

| | | |
|---|---|---|
| EP | 0668565 A1 | 8/1995 |

OTHER PUBLICATIONS

T.M.Austin, D.N. Pnevmatikos, G.S. Sohi, "Streamlining Data Cache Access with Fast Address Calculation," In 22nd International Symposium on Computer Architecture, 1995, 12 pages, Jun. 22, 1995.

J. Bradley Chen, Anita Borg, and Norman P. Jouppi, "A Simulation Based Study of TLB Performance," In Proc. 19th ISCA. ACM, 1992, 32 pages.

"U5S 486 Green CPU," United Microelectronics Corporation, 1994–95, pp. 3–1 to 3–26.

"Intel Microprocessors," vol. 1, Intel Corporation, 1993, pp. 2–229 to 2–287.

"Computer Architecture A Quantitative Approach," Hennessey and Patterson, pp. 432–497 (1990).

Hua, A. Hunt, L. Liu, J–K Peir, D. Pruett, and J. Temple, "Early Resolution of Address Translation in Cache Design," Proc. of Int'l Conf. on Computer Designs, Oct. 1990, pp. 408–412.

"DPS–8 Assembly Instructions," Honeywell Corporation, Apr., 1980, Chapters 3 and 5.

"The Multics System," Elliot Organick, 1972, pp. 6–7, 38–51.

* cited by examiner

*Primary Examiner*—T Nguyen
(74) *Attorney, Agent, or Firm*—J. Nicholas Gross

(57) ABSTRACT

An improved address translation method and mechanism for memory management in a computer system is disclosed. A segmentation mechanism employing segment registers maps virtual addresses into a linear address space. A paging mechanism optionally maps linear addresses into physical or real addresses. Independent protection of address spaces is provided at each level. Information about the state of real memory pages is kept in segment registers or a segment register cache potentially enabling real memory access to occur simultaneously with address calculation, thereby increasing performance of the computer system.

15 Claims, 5 Drawing Sheets

PRIOR ART SEGMENT DESCRIPTOR REGISTER

SEGMENT DESCRIPTOR MEMORY

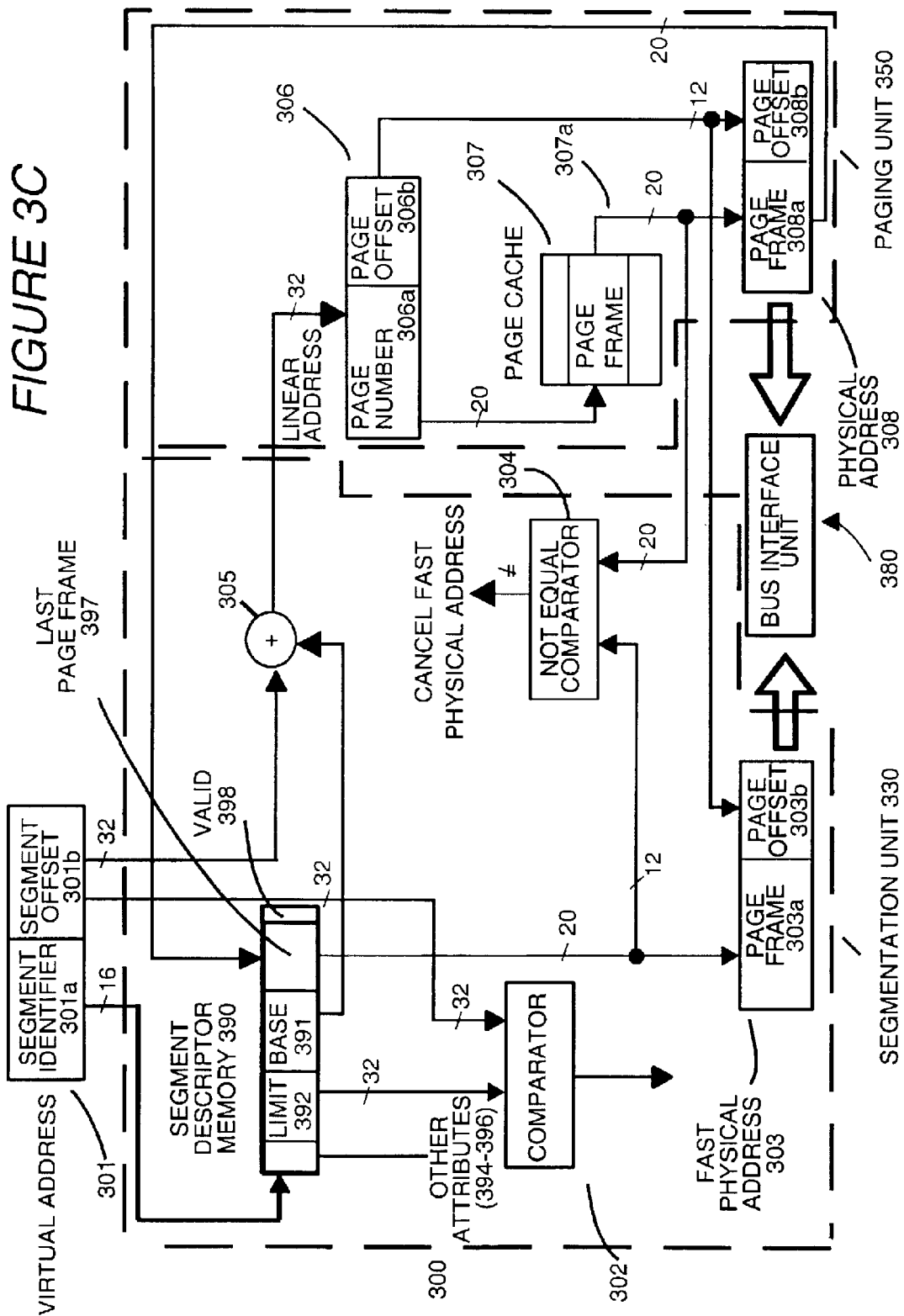

SPECULATIVE ADDRESS TRANSLATION FOR PROCESSOR USING SEGMENTATION AND OPTIONAL PAGING

RELATED APPLICATION DATA

This application is a continuation of application Ser. No. 09/757,439 filed Jan. 10, 2001, now U.S. Pat. No. 6,430,668, which is a continuation of Ser. No. 08/905,356 filed Aug. 4, 1997, now U.S. Pat. No. 6,226,733, which in turn is a continuation of Ser. No. 08/458,479 filed on Jun. 2, 1995, now U.S. Pat. No. 5,895,503.

FIELD OF THE INVENTION

The invention relates to the field of address translation for memory management in a computer system.

BACKGROUND OF THE INVENTION

Advanced computer hardware systems operate with complex computer software programs. Computer system designers typically separate the virtual address space, the address space used by programmers in their development of software, and the physical address space, the address space used by the computer system. This separation allows programmers to think in terms of their conceptual models, and to design computer software programs without reference to specific hardware implementations. During the actual execution of programs by the computer system, however, these separate addresses must be reconciled by translating software program virtual addresses into actual physical addresses that can be accessed in a computer memory subsystem.

There are many well known approaches for address translation in the memory management mechanism of a computer system. These approaches fall into basically two major categories: those which map the smaller virtual (sometimes called logical, symbolic or user) addresses onto larger physical or real memory addresses, and those which map larger virtual addresses onto smaller physical memory. Translation mechanisms of the former category are employed typically in minicomputers in which relatively small address fields (e.g.: 16 bit addresses) are mapped onto larger real memory. Translation mechanisms of the second category are used typically in microprocessors, workstations and mainframes. Within each of these categories, segmentation only, paging only, and a combination of segmentation and paging are well known for accomplishing the translation process.

The present invention is primarily directed to address translation mechanisms where larger virtual addresses are mapped onto smaller physical addresses, and further to systems where segmentation and optional paging is employed.

In a segmentation portion of an address translation system, the address space of a user program (or programs cooperatively operating as processes or tasks), is regarded as a collection of segments which have common high-level properties, such as code, data, stack, etc. The segmented address space is referenced by a 2-tuple, known as a virtual address, consisting of the following fields: <<s>,<d>>, where <s> refers to a segment number (also called identifier or locator), and <d> refers to a displacement or offset, such as a byte displacement or offset, within the segment identified by the segment number. The virtual address <17,421>, for example, refers to the 421st byte in segment 17. The segmentation portion of the address translation mechanism, using information created by the operating system of the computer system, translates the virtual address into a linear address in a linear address space.

In a paging portion of an address translation system, a linear (or intermediate) address space consists of a group of pages. Each page is the same size (i.e. it contains the same number of addresses in the linear space). The linear address space is mapped onto a multiple of these pages, commonly, by considering the linear address space as the 2-tuple consisting of the following fields: <,>. The page number (or page frame number) determines which linear page is referenced. The page offset is the offset or displacement, typically a byte offset, within the selected page.

In a paged system, the real (physical) memory of a computer is conceptually divided into a number of page frames, each page frame capable of holding a single page. Individual pages in the real memory are then located by the address translation mechanism by using one or more page tables created for, and maintained by, the operating system. These page tables are a mapping from a page number to a page frame. A specific page may or may not be present in the real memory at any point in time.

Address translation mechanisms which employ both segmentation and paging are well known in the art. There are two common subcategories within this area of virtual address translation schemes: address translation in which paging is an integral part of the segmentation mechanism; and, address translation in which paging is independent from segmentation.

In prior art address translation mechanisms where paging is an integral part of the segmentation mechanism, the page translation can proceed in parallel with the segment translation since segments must start at page boundaries and are fixed at an integer number of pages. The segment number typically identifies a specific page table and the segment offset identifies a page number (through the page table) and an offset within that page. While this mechanism has the advantage of speed (since the steps can proceed in parallel) it is not flexible (each segment must start at a fixed page boundary) and is not optimal from a space perspective (e.g. an integer number of pages must be used, even when the segment may only spill over to a fraction of another page).

In prior art address translation mechanisms where paging is independent from segmentation, page translation generally cannot proceed until an intermediate, or linear, address is first calculated by the segmentation mechanism. The resultant linear address is then mapped onto a specific page number and an offset within the page by the paging mechanism. The page number identifies a page frame through a page table, and the offset identifies the offset within that page. In such mechanisms, multiple segments can be allocated into a single page, a single segment can comprise multiple pages, or a combination of the above, since segments are allowed to start on any byte boundary, and have any byte length. Thus, in these systems, while there is flexibility in terms of the segment/page relationship, this flexibility comes at a cost of decreased address translation speed.

Certain prior art mechanisms where segmentation is independent from paging allow for optional paging. The segmentation step is always applied, but the paging step is either performed or not performed as selected by the operating system. These mechanisms typically allow for backward compatibility with systems in which segmentation was present, but paging was not included.

Typical of the prior art known to the Applicant in which paging is integral to segmentation is the Multics virtual memory, developed by Honeywell and described by the book, "The Multics System", by Elliott Organick. Typical of the prior art known to the Applicant in which optional paging is independent from segmentation is that described in U.S. Pat. No. 5,321,836 assigned to the Intel Corporation, and that described in the Honeywell DPS-8 Assembly Instructions Manual. Furthermore, U.S. Pat. No. 4,084,225 assigned to the Sperry Rand Corporation contains a detailed discussion of general segmentation and paging techniques, and presents a detailed overview of the problems of virtual address translation.

Accordingly, a key limitation of the above prior art methods and implementations where segmentation is independent from paging is that the linear address must be fully calculated by the segmentation mechanism each time before the page translation can take place for each new virtual address. Only subsequent to the linear address calculation, can page translation take place. In high performance computer systems computer systems, this typically takes two full or more machine cycles and is performed on each memory reference. This additional overhead often can reduce the overall performance of the system significantly.

SUMMARY OF THE INVENTION

An object of the present invention, therefore, is to provide the speed performance advantages of integral segmentation and paging and, at the same time, provide the space compaction and compatibility advantages of separate segmentation and paging.

A further object of the present invention is to provide a virtual address translation mechanism which architecturally provides for accelerating references to main memory in a computer system which employs segmentation, or which employs both segmentation and optional paging.

Another object of the present invention is to provide additional caching of page information in a vital address translation scheme.

An further object of the present invention is to provide a virtual address translation mechanism which reduces the number of references required to ensure memory access.

According to the present invention, a segmentation unit converts a virtual address consisting of a segment identifier and a segment offset into a linear address. The segmentation unit includes a segment descriptor memory, which is selectable by the segment identifier. The entry pointed to by the segment identifier contains linear address information relating to the specific segment (i.e., linear address information describing the base of the segment referred to by the segment identifier, linear address information describing the limit of the segment referred to by the segment identifier, etc.) as well as physical address information pertaining to the segment—such as the page base of at least one of the pages represented by said segment.

In the above embodiment, unlike prior art systems, both segmentation and paging information are kept in the segmentation unit portion of the address translation system. The caching of this page information in the segmentation unit permits the address translation process to occur at much higher speed than in prior art systems, since the physical address information can be generated without having to perform a linear to physical address mapping in a separate paging unit.

The page base information stored in the segmentation unit is derived from the page frame known from the immediately prior in time address translation on a segment-by-segment basis. In order to complete the full physical address translation (i.e., a page frame number and page offset), the segmentation unit combines the page frame from the segment descriptor memory with the page offset field, and may store this result in a segmentation unit memory, which can be a memory table, or a register, or alternatively, it may generate the full physical address on demand.

This fast physical address generated by the segmentation unit based on the virtual address and prior page information can be used by a bus interface to access a physical location in the computer memory subsystem, even before the paging unit has completed its translation of the linear address into a page frame and page offset. Thus, fewer steps and references are required to create a memory access. Consequently, the address translation step occurs significantly faster. Since address translation occurs in a predominant number of instructions, overall system performance is improved.

The memory access is permitted to proceed to completion unless a comparison of the physical address information generated by the paging unit with the fast physical address generated by the segmentation unit shows that the page frame information of the segmentation unit is incorrect.

In alternative embodiments, the segmentation unit either generates the page offset by itself (by adding the lower portion of the segment offset and the segment base address) or receives it directly from the paging unit.

In further alternate embodiments, the incoming segment offset portion of the virtual address may be presented to the segmentation unit as components. The segmentation unit then combines these components in a typical base-plus-offset step using a conventional multiple input (typically 3-input) adder well known in the prior art.

As shown herein in the described invention, the segment descriptor memory may be a single register, a plurality of registers, a cache, or a combination of cache and register configurations.

BRIEF DESCRIPTION OF THE DRAWINGS

FIG. 3C is a block diagram of another embodiment of the present invention, showing an alternative circuit for generating the fast physical address information.

DETAILED DESCRIPTION OF THE MENTION

General Discussion of Paging & Segmentation

The present invention provides for improved virtual address translation in a computer system. The preferred embodiment employs the invention in a single-chip microprocessor system, however, it is well understood that such a virtual address translation system could be implemented in multiple die and chip configurations without departing from the spirit or claims of the present invention.

Before embarking on a specific discussion of the present invention, however, a brief explanation of the general principles of segmentation and paging follows in order to provide additional background information, and so that the teachings of the present invention may be understood in a proper context.

Figure 1:
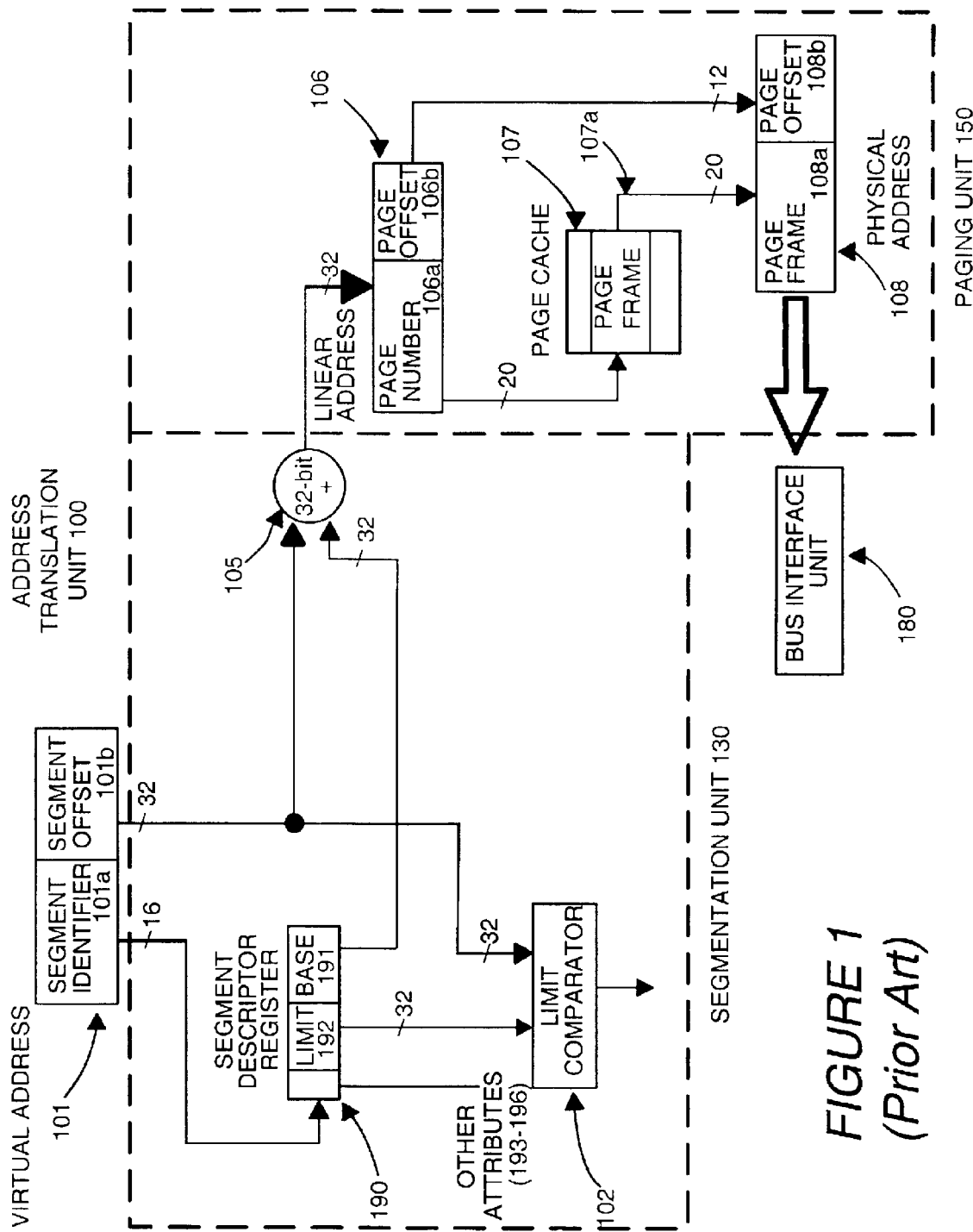
FIG. 1 is a block of a typical prior art virtual address translation mechanism using segmentation and independent paging.

Referring to FIG. 1, a typical prior art virtual address translation mechanism 100 using both segmentation and, optionally, paging in a computer system is shown. As described in this figure, a data path within the microprocessor transmits a virtual address 101, consisting of segment identifier 101a and a segment offset 101b, to segmentation unit 130. Segments are defined by segment descriptor entries in at least one segment descriptor table or segment descriptor segment (not shown). Segment descriptor tables are created and managed by the operating system of the computer system, and are usually located in the memory subsystem. Segment descriptor entries are utilized in the CPU of the computer system by loading them into segment descriptor register 190 or a segment descriptor cache (not shown); the segment descriptor register/cache is usually internal to the CPU, and thus more quickly accessible by the translation unit.

In the paging unit 150, pages are defined by a page table or multiple page tables (not shown), also created and managed by the operating system; again, these tables are also typically located in a memory subsystem. All or a portion of each page table can be loaded into a page cache 107 (within the CPU, sometimes called a translation look-aside buffer) to accelerate page references.

In operation, the segmentation unit 130 first translates a virtual address to a linear address and then (except in the case when optional paging is disabled) paging unit 150 translates the linear address into a real (or physical) memory address.

Typically (as in an x86 microprocessor) the segmentation unit translates a 48-bit virtual address 101 consisting of a 16-bit segment identifier (<s>) 101a and a 32-bit displacement within that segment (<d>) 101b to a 32-bit linear (intermediate) address 106. The 16-bit segment identifier 101a uniquely identifies a specific segment; this identifier is used to access an entry in a segment descriptor table (not shown). In the prior art, this segment descriptor entry contains a base address of the segment 191, the limit of the segment 192, and other attribute information described further below. The segment descriptor entry is usually loaded into a segment descriptor register 190.

Using adder 105, the segmentation unit adds the segment base 191 of the segment to the 32-bit segment offset 101b in the virtual address to obtain a 32-bit linear address. The 32-bit segment offset 10b in the virtual address is also compared against the segment limit 192, and the type of the access is checked against the segment attributes. A fault is generated and the addressing process is aborted if the 32-bit segment offset is outside the segment limit, or if the type of the access is not allowed by the segment attributes.

The resulting linear address 106 can be treated as an offset within a linear address space; and in the commonly implemented schemes of the prior art, these offsets are frequently byte offsets. When optional paging is disabled, the linear address 106 is exactly the real or physical memory address 108. When optional paging is enabled, the linear address is treated as a 2- or 3-tuple depending on whether the paging unit 150 utilizes one or two level page tables.

In the 2-tuple case shown in FIG. 1 which represents single level paging, the linear address, <<p>,<pd>> is divided into a page number field <p> 106a, and a page displacement page offset) field within that page (<pd>) 106b. In the 3-tuple case (not shown) <<dp>,<p>,<pd>>, the linear address is divided into a page directory field (<dp>), a page number field <p> and a page displacement field <pd>. The page directory field indexes a page directory to locate a page table (not shown). The page number field indexes a page table to locate the page frame in real memory corresponding to the page number, and the page displacement field locates a byte within the selected page frame. Thus, paging unit 150 translates the 32-bit linear address 106 from the segmentation unit 130 to a 32-bit real (physical) address 108 using one or two level page tables using techniques which are well known in the art.

In all of the above prior art embodiments where segmentation is independent from paging, the segment descriptor table or tables of the virtual address translator are physically and logically separate from the page tables used to perform the described page translation. There is no paging information in the segment descriptor tables and, conversely, there is no segmentation information in the page tables.

Figure 2A:
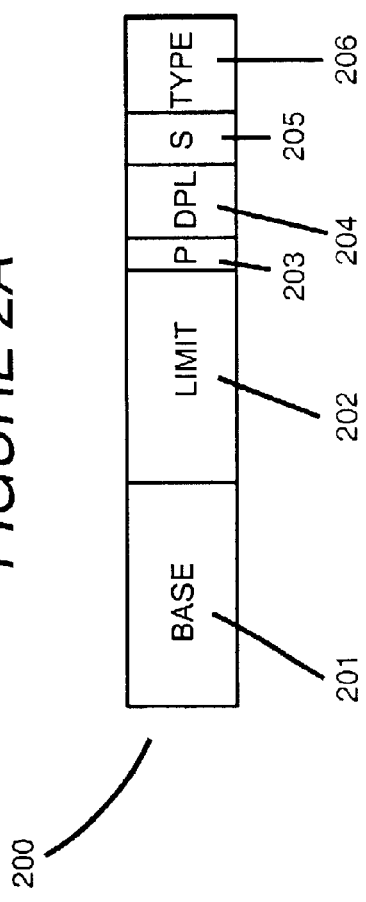
FIG. 2A is a detailed diagram of a typical segment descriptor register of the prior art.

This can be seen in FIG. 2A. In this figure, a typical prior art segment descriptor entry 200, is shown as it is typically used in a segment descriptor table or segment descriptor register associated with a segmentation unit. As can be seen there, segment descriptor 200 includes information on the segment base 201, the segment limit 202, whether the segment is present (P) 203 in memory, the descriptor privilege level (DPL) 204, whether the segment belongs to a user or to the system (S) 205, and the segment type 206 (code, data, stack, etc.)

For additional discussions pertaining to the prior art in segmentation, paging, segment descriptor tables, and page tables, the reader is directed to the references U.S. Pat. Nos. 5,408,626, 5,321,836, 4,084,225, which are expressly incorporated by reference herein.

Improved Segmentation Unit Using Paging Information

As shown in the immediate prior art, the paging and segmentation units (circuits) are completely separate and independent. Since the two units perform their translation sequentially, that is, the segment translation must precede the page translation to generate the linear address, high performance computer systems, such as those employing superscalar and superpipelined techniques, can suffer performance penalties. In some cases, it is even likely that the virtual address translation could fall into the systems' "critical path". The "critical path" is a well-known characteristic of a computer system and is typically considered as the longest (in terms of gate delay) path required to complete a primitive operation of the system.

Accordingly, if the virtual address translation is in the critical path, the delays associated with this translation could be significant in overall system performance. With the recognition of this consideration, the present invention includes page information in the segment translation process. The present invention recognizes the potential performance penalty of the prior art and alleviates it by storing paging information in the segmentation unit obtained from a paging unit in previous linear-to-real address translations.

Figure 2B:
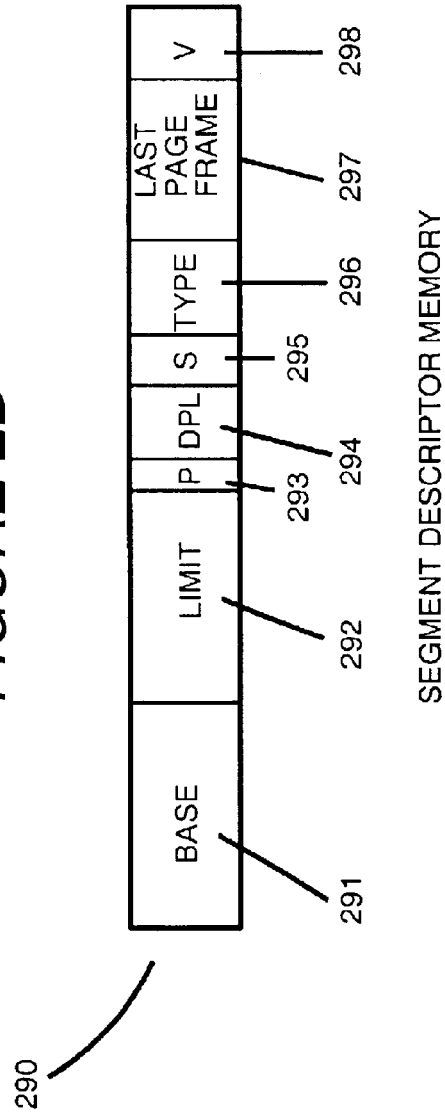
FIG. 2B is a detailed diagram of an embodiment of the present invention, including a portion of a segment descriptor memory used for storing physical address information.

As can be seen in FIG. 2B, the present invention extends the segment descriptor entries of the prior art with a segment entry 290 having two additional fields: a LAST PAGE FRAME field 297 and a VALID field 298. The LAST PAGE FRAME field 297 is used to hold the high-order 20 bits (i.e.: the page frame) of the real (physical) memory address of the last physical address generated using the specified segment identifier. The VALID field 298 is a 1-bit field, and indicates whether or not the LAST PAGE FRAME field 297 is valid. The remaining fields 291–296 perform the same function as comparable fields 201–206 respectively described above in connection with FIG. 2A.

Segment descriptor tables (not shown) can be located in a memory subsystem, using any of the techniques well-known in the art. As is also known in the art, it is possible to speed up address translation within the segmentation unit by using a small cache, such as one or more registers, or associative memory. The present invention makes use of such a cache to store segment entries 290 shown above. Unlike the prior art, however, the segment entries 290 of the present invention each contain information describing recent physical address information for the specified segment. Accordingly, this information can be used by a circuit portion of the segmentation unit to generate a new physical address without going through the linear to physical mapping process typically associated with a paging unit.

While in some instances the physical address information may change between two time-sequential virtual addresses to the same segment (and thus, a complete translation is required by both the segmentation and paging units), in the majority of cases the page frame information will remain the same. Thus, the present invention affords a significant speed advantage over the prior art, because in the majority of cases a complete virtual-linear-physical address translation is not required before a memory access is generated.

Embodiment with Segmentation & Optional Paging/Paging Disabled

Figure 3A:
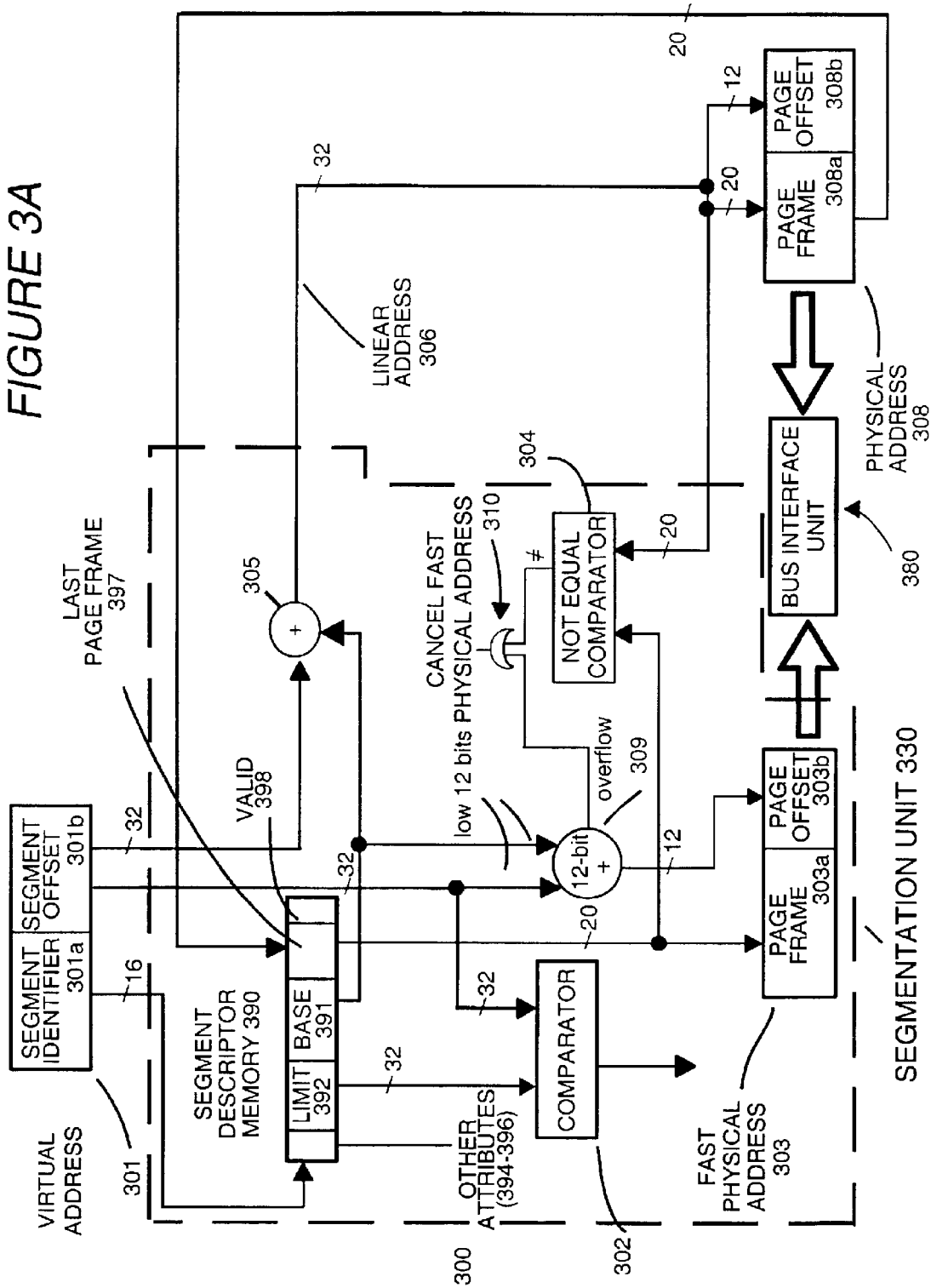
FIG. 3A is a block diagram of an embodiment of the present invention employing segmentation and optional paging, and showing the overall structure and data paths used when paging is disabled during an address translation.

Referring to FIG. 3A, the advantage of using this new information in segment entry 290 in a segmentation unit or segmentation circuit is apparent from a review of the operation of an address translation. In this figure, a paging unit (or paging circuit) is disabled, as for example might occur only when a processor is used in a real mode of operation, rather than a protected mode of operation.

In a preferred embodiment, the present invention employs a segment descriptor memory comprising at least one, and preferably many, segment descriptor registers 390, which are identical in every respect to the segment descriptor register described above in connection with FIG. 2B. These segment descriptor registers are loaded from conventional segment descriptor tables or segment descriptor segments which are well known in the art. Each segment descriptor register 390 is loaded by the CPU before it can be used to reference physical memory. Segment descriptor register 390 can be loaded by the operating system or can be loaded by application programs. Certain instructions of the CPU are dedicated to loading segment descriptor registers, for example, the "LDS" instruction, "Load Pointer to DS Register". Loading by the operating system, or execution of instructions of this type, causes a base 391, limit 392, descriptor privilege level 394, system/user indicator 395, and type 396 to be loaded from segment tables or segment descriptor segments as in the prior art. The three remaining fields are present 393, LAST PAGE FRAME 397 and VALID 398. When a segment descriptor register 390 is loaded, present 393 is set to 1, indicating that the segment descriptor register 390 contents are present; the valid field 398 is set to 0, indicating that the last page frame number field 397 is not valid; and the LAST PAGE FRAME field 397 is not set, or may be set to 0.

After the loading of a segment descriptor register 390, instructions of the CPU may make references to virtual memory; if a segment descriptor register is referenced before it is loaded, as indicated by present field 393 set to 0, a fault occurs and the reference to the segment descriptor register is aborted.

As explained above, the CPU makes references to virtual memory by specifying a 48-bit virtual address, consisting of a 16-bit segment identifier 301a and a 32-bit segment offset 301b. A data path within the CPU traits virtual address 301 to the address translation mechanism 300.

Segment descriptor memory 390 is indexed by segment number, so each entry in this memory containing data characteristics (i.e., base, access rights, limit) of a specific segment is selectable by the segment identifier from the vital address. Assuming this is the first reference to physical memory specifying a newly loaded segment descriptor register, since the VALID bit 398 is set to false, a prior art virtual address translation takes place. This involves, among other things, as explained earlier, various validity checks (including checking attributes 394–396, segment limit checking using comparator 302 and potentially others), and using adder 305 to add the segment descriptor's base address 391 to the segment offset 301b to calculate a linear address 306.

While the implementation in the embodiment of FIG. 3A shows the addition of the base address 391 to the segment offset 301b using adder 305 to generate the linear address 306, it will be understood by those skilled in the art that this specific implementation of the virtual to linear address translation is not the only implementation of the present invention. In other implementations, the segment offset 301b might consist of one or more separate components. Different combinations of one or more of these components might be combined using well known techniques to form a linear address, such as one utilizing a three-input adder. The use of these components is discussed, for example, in U.S. Pat. No. 5,408,626, and that description is incorporated by reference herein.

As is well known, in this embodiment where paging is disabled, linear address 306 is also a physical address which can be used as the physical address 308. Memory access control operations are not shown explicitly since they are only ancillary to the present invention, and are well described in the prior art. In general, however, a bus interface unit 380 is typically responsible for interactions with the real (physical) memory subsystem. The memory subsystem of a computer system employing the present invention preferably has timing and address and data bus transaction details which are desirably isolated from the CPU and address translation mechanism. The bus interface unit 380 is responsible for this isolation, and can be one of many conventional bus interface units of the prior art.

In the present invention, bus interface unit 380 receives the real memory address 308 from address translation mechanism 300 and coordinates with the real memory subsystem to provide data, in the case of a memory read request, or to store data, in the case of a memory write request. The real memory subsystem may comprise a hierarchy of real memory devices, such as a combination of data caches and dynamic RAM, and may have timing dependencies and characteristics which are isolated from the CPU and address translation mechanism 300 of the computer system by the bus interface unit 380.

Simultaneous with the first memory reference using the calculated physical address 308, the LAST PAGE FRAME field of the selected segment descriptor register 390 is loaded with the high-order 20 bits of the physical address, i.e.: the physical page frame, and the VALID bit is set to indicate a valid state. This paging information will now be used in a next virtual address translation.

Accordingly, when a next, new virtual address 301 is to be translated, the entry selected from segment descriptor memory 390 will likely contain the correct physical frame page number (in the LAST PAGE FRAME field 397). Thus, in most cases, the base physical address in memory for the next, new referenced virtual address will also be known from a previous translation.

The first step of the virtual address translation, therefore, is to determine if a FAST PHYSICAL ADDRESS 303 can be used to begin a fast physical memory reference. Adder 309, a 12-bit adder, adds the low-order 12 bits of the segment offset 301b of virtual address 301 to the low-order 12-bits of base 391 of the segment entry in segment descriptor register 390 referenced by the segment identifier 301a. This addition results in a page offset 303b. In parallel with adder 309, 32-bit adder 305 begins a fill 32-bit add of segment base 391 and segment offset 301b, to begin producing the linear address; however, this full 32-bit add will obviously require more time. In the preferred embodiment, adder 309 is a separate 12-bit adder, however, it should be noted that adder 309 also could be implemented as the low order 12-bits of 32-bit adder 305.

Simultaneous with the beginning of these two operations, VALID bit 398 is inspected. If VALID bit 398 is set to 1, as soon as 12-bit adder 309 has completed, 20-bit LAST PAGE FRAME 397 is concatenated with the result of adder 309 to produce FAST PHYSICAL ADDRESS 303, consisting of a page frame number 303a, and page offset 303b. FAST PHYSICAL ADDRESS 303 then can be used to tentatively begin a reference to the physical memory. It should be understood that the FAST PHYSICAL ADDRESS 303 transmitted to bus interface unit 380 could also be stored in a register or other suitable memory storage within the CPU.

In parallel with the fast memory reference, limit field 392 is compared to the segment offset 301b of the virtual address by comparator 302. If the offset in the virtual address is greater than the limit, a limit fault is generated, and vital address translation is aborted.

Also in parallel with the fast memory reference, adder 305 completes the addition of base 391 to the segment offset field 301b of virtual address to produce linear address (in this case physical address also) 306. When this calculation is completed, the page frame number 308a of physical address 308 is compared to LAST PAGE FRAME 397 by Not Equal Comparator 304. If page frame 308a is unequal to the LAST PAGE FRAME 397, or if 12-bit Adder 309 overflowed (as indicated by a logic "1" at OR gate 310), the fast memory reference is canceled, and the linear address 306, which is equal to the physical address 308, is used to begin a normal memory reference. If page frame 308a is equal to LAST PAGE FRAME 397, and 12-bit Adder 309 did not overflow (the combination indicated by a logic "0" at the output of OR gate 310), the fast memory reference is allowed to fully proceed to completion.

After any fast memory reference which is cancelled by the CANCEL FAST PHYSICAL ADDRESS signal output of OR gate 310, page frame 308a is loaded into the LAST PAGE FRAME 397 in the segment descriptor memory 390 for subsequent memory references.

Depending on the particular design desired, it should also be noted that writes to the memory, or reads which cause faults using FAST PHYSICAL ADDRESS 303 may be pended since the FAST PHYSICAL ADDRESS 303 may prove to be invalid.

Accordingly, it can be seen that the parallel physical address calculation undertaken by the improved segmentation unit of the present invention generates a faster physical memory access than possible with prior art systems.

Embodiment with Segmentation & Paging/Paging Enabled

Figure 3B:
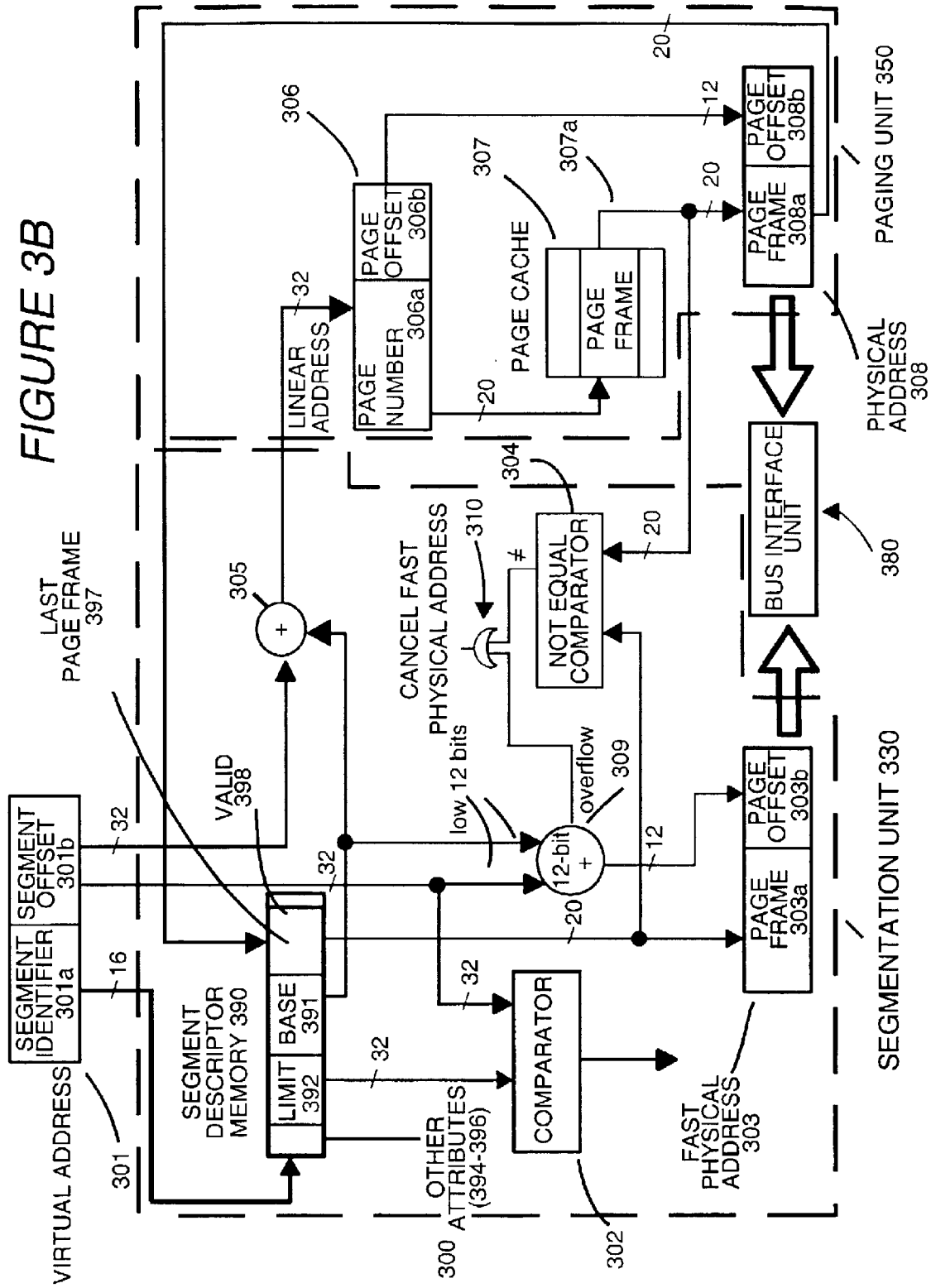
FIG. 3B is a block diagram of the embodiment of FIG. 3A showing the overall structure and data paths used when paging is enabled during an address translation.

The present invention can also be used with address translation units using paging enabled, as can be seen in the embodiments of FIGS. 3B and 3C.

In the embodiment of FIG. 3B, the same segmentation unit structure 300 as that shown in FIG. 3A is used, and the operation of segmentation unit 300 is identical to that already explained above. As before, segment descriptor memory (registers) 390 are loaded from conventional segment descriptor tables or segment descriptor segments, using one or more of the procedures described above. First, the base 391 limit 392 descriptor privilege level 394, system/ user indicator 395, and type 396 are loaded from segment tables or segment descriptor segments as explained earlier. When segment descriptor register 390 is loaded, present 393 is set to 1, indicating that the segment descriptor register 390 contents are present; the valid field 398 is set to 0, indicating that the last page frame number field 397 is not valid; and the LAST PAGE FRAME field 397 is not set, or may be set to 0.

As explained above, after the loading of a segment descriptor register 390, instructions of the CPU may make references to virtual memory; if a segment descriptor register is referenced before it is loaded, as indicated by present field 393 set to 0, a fault occurs and the reference to the segment descriptor register is aborted.

As further explained above, the 48 bit virtual address 301 (consisting of a 16 bit segment identifier 301a and a 32 bit segment offset 301b) is transmitted by a data path to segmentation unit 300, and an index into segment descriptor memory 390 is performed to locate the specific segment descriptor for the segment pointed to by segment identifier 301a. Assuming this is the first reference to physical memory specifying a newly loaded segment descriptor register, since the VALID bit is set to false, a prior art virtual address translation takes place. This involves, among other things, as explained earlier, various validity checks (including checking attributes 394–396, segment limit checking using comparator 302 and potentially others), and using adder 305 to add the segment descriptor's base address 391 to the segment offset 301b to calculate a linear address 306.

As is well known, in this configuration where paging is enabled, linear address 306 must undergo a further translation by paging unit 350 to obtain the physical address 308 in the memory subsystem. In the preferred embodiment of the invention, looking first at FIG. 3B, the output of adder 305 will be a 32-bit linear address, corresponding to a 20-bit page number 306a and a 12-bit page offset 306b. Typically, the page number 306a is then indexed into a page descriptor table (not shown) to locate the appropriate page frame base physical address in memory. These page descriptor tables are set up by the operating system of the CPU using methods and structures well known in the art, and they contain, among other things, the base physical address of each page frame, access attributes, etc.

However, in most systems, including the present invention, a page cache 307 is used in order to hold the physical base addresses of the most recently used page frames. This cache can take the form of a table, associative cache, or other suitable high speed structure well known in the art. Thus, page number 306a is used to access page data (including physical base addresses for page frames) in an entry in page cache 307.

If page cache 307 hits, two thins happen first, a 20-bit PAGE FRAME 307a (the page frame in physical memory) replaces the high-order 20 bits (page number 306a) of the linear address 306, and, when concatenated with the page offset 306b results in a real (physical) address 308, which is used to perform a memory access through bus interface unit 380 along the lines explained above. Second, newly generated page frame 308a is also stored in segment descriptor memory 390 in the selected LAST PAGE FRAME field 397 to be used for a fast access in the next address translation. When LAST PAGE FRAME field 397 is stored, selected VALID bit 398 is set to 1 to indicate that LAST PAGE FRAME 397 is valid for use.

In the event of a page cache miss, the appropriate page frame number 308a is located (using standard, well-known techniques) to generate physical address 308, and is also loaded into segment descriptor memory 390 in the selected LAST PAGE FRAME field 397. The selected VALID bit 398 is also set to indicate a valid state. Thus, there is paging information in the segmentation unit that will now be used in the nest virtual address translation.

When a next, new virtual address 301 is to be translated, the segment identifier 301a will likely be the same as that of a previously translated virtual address, and the entry selected from segment descriptor memory 390 will also likely contain the correct physical frame (in LAST PAGE FRAME field 397) from the previous translation. As with the above embodiment, one or more registers, or a cache may be used for the segment descriptor memory 390.

The first step then determines if a FAST PHYSICAL ADDRESS 303 can be used to begin a fast physical memory reference. Adder 309, a 12-bit adder, adds the low-order 12 bits of the segment offset 301b of oval address 301 to the low-order 12-bits of base 391 of the segment entry in segment descriptor register 390 referenced by the segment identifier 301a. This addition results in a page offset 303b. In parallel with adder 309, 32-bit adder 305 begins a full 32-bit add of segment base 301 and segment offset 301b, to begin producing the linear address; however, this full 32-bit add will obviously require more time. In the preferred embodiment, adder 309 is a separate 12-bit adder, however, it should be noted that adder 309 also could be implemented as the low order 12-bits of 32-bit adder 305.

Simultaneous with these beginning of these two operations, VALID bit 398 is inspected. If VALID bit 398 is set to 1, as soon as 12-bit adder 309 has completed, 20-bit LAST PAGE FRAME 397 is concatenated with the result of adder 309 to produce FAST PHYSICAL ADDRESS 303, consisting of a page frame number 303a, and page offset 303b. FAST PHYSICAL ADDRESS 303 then can be used to tentatively begin a reference to the physical memory. Again, it should be understood that the FAST PHYSICAL ADDRESS 303 transmitted to bus interface unit 380 could also be stored in a register or other suitable memory storage within the CPU.

As before, limit field 302 is compared to the segment offset 301b of the virtual address by comparator 302. If the offset in the virtual address is greater than the limit, a limit fault is generated, and virtual address translation is aborted.

This new virtual address is also translated by paging unit 350 in the same manner as was done for the previous virtual address. If page cache 307 hits based on the page number 306a, two things happen: first, a 20-bit PAGE FRAME 307a (the page frame in physical memory) replaces the high-order 20 bits (page number 306a) of the linear address 306, and, when concatenated with the page offset 306b results in a physical address 308. This real address may or may not be used, depending on the result of the following: in parallel with the aforementioned concatenation, the PAGE FRAME 307a, is compared to LAST PAGE FRAME 397 from the segment descriptor memory 390 by Not Equal Comparator 304. The result of Not Equal Comparator (that is, the Not Equal condition) is logically ORed with the overflow of 12-bit adder 309 by OR gate 310. If the output of OR gate 310 is true (i.e. CANCEL FAST PHYSICAL ADDRESS is equal to binary one), or if PAGE CACHE 307 indicates a miss condition, the fast memory reference previously begun is canceled, since the real memory reference started is an invalid reference. Otherwise, the fast memory reference started is allowed to fully proceed to completion, since it is a valid real memory reference.

If CANCEL FAST PHYSICAL ADDRESS is logic true, it can be true for one of two, or both reasons. In the case that Or gate 310 is true, but page cache 307 indicates a hit condition, physical address 308 is instead used to start a normal memory reference. This situation is indicative of a situation where LAST PAGE FRAME 397 is different from the page frame 308a of the current reference.

In the case that page cache 307 did not indicate a hit, a page table reference through the page descriptor table is required and virtual address translation proceeds as in the prior art. The page frame 308a information is again stored in the LAST PAGE FRAME field 397 in the segment descriptor memory 390 for the next translation.

Also, after any fast memory reference which is canceled by the CANCEL FAST PHYSICAL ADDRESS signal output of OR gate 310, page frame number 308a is loaded into the LAST PAGE FRAME 397 in the segment descriptor memory 390 for subsequent memory references.

Depending on the particular design desired, it should also be noted that in this embodiment also, writes to the memory, or reads which cause faults using FAST PHYSICAL ADDRESS 303 may be pended since the FAST PHYSICAL ADDRESS 303 may prove to be invalid.

The alternative embodiment shown in FIG. 3C is identical in structure and operation to the embodiment of FIG. 3B, with the exception that the 12-bit Adder 309 is not employed. In this embodiment, the segmentation unit 330 does not create the lower portion (page offset 303a) of the fast physical address in this manner. Instead, the page offset 306a resulting from 32-bit adder 305 is used.

It can be seen that the present invention has particular relevance to computers using sequential type of segmentation and paging translation, such as the X86 family of processors produced by the Intel Corporation (including the Intel 80386, Intel 80486 and the Intel Pentium Processor), other X86 processors manufactured by the NexGen Corporation, Advanced Micro Devices, Texas Instruments, International Business Machines, Cyrix Corporation, and certain prior art computers made by Honeywell. These processors are provided by way of example, only, and it will be understood by those skilled in the art that the present invention has special applicability to any computer system where software executing on the processors is characterized by dynamic execution of instructions in programs in such a way that the virtual addresses are generally logically and physically located near previous virtual addresses.

The present invention recognizes this characteristic, employing acceleration techniques for translating virtual to real addresses. In particular, the present invention utilizes any of the commonly known storage structures (specific examples include high speed registers and/or caches) to store previous address translation information, and to make this previous address translation information available to the system whenever the next subsequent reference relies on the same information. In this way, the system can utilize the previously stored information from the high speed storage to begin real memory references, rather than be forced to execute a more time consuming translation of this same information, as was typically done in the prior art.

As will be apparent to those skilled in the art, there are other specific circuits and structures beyond and/or in addition to those explicitly described herein which will serve to implement the translation mechanism of the present invention. Finally, although the above description enables the specific embodiment described herein, these specifics are not intended to restrict the invention, which should only be limited as defined by the following claims.

I claim:

1. A method of generating a speculative memory address from a virtual address having both a segment identifier and a segment offset in a computer system employing both segmentation and optional independent paging, the method including the steps of:
   (a) converting a portion of the virtual address into a partial linear address; and
   (b) combining the partial linear address with physical address information obtained from a prior memory address generation to generate the speculative memory address.

2. The method of claim 1, wherein the speculative memory address is used to initiate a speculative memory access.

3. The method of claim 2 wherein the speculative memory access is to a cache memory.

4. A method of generating a speculative memory access to a memory associated with a microprocessor based on translating a virtual address having both a segment identifier and a segment offset in a computer system employing both segmentation and optional independent paging, the method including the steps of:
   (a) performing a first complete translation of a first virtual address to generate a first complete physical address from a complete linear address, said first complete physical address including a first physical page frame;
   (b) storing the first physical page frame in a first cache within the microprocessor;
   (c) subsequently converting at least a portion of a second virtual address into a partial linear address in the microprocessor while a second complete translation is occurring for the second virtual address to generate a complete second physical address from a complete second linear address, said second complete physical address including a second physical page frame;
   (d) using the partial linear address to perform a first fast memory access to a data cache in parallel with said second complete translation;
   (e) comparing the first physical page frame with said second physical page frame;
   (f) performing a second normal memory access when said first physical page frame is not equal to said second physical page frame.

5. The method of claim 4, wherein said complete second linear address is 32 bits long, and said partial linear address consists of low order bits of said complete second linear address.

6. The method of claim 4, wherein writes to said data cache are pended until said first memory access is determined to be valid.

7. A system for performing page address translation for a virtual address to physical address translation within a processor that employs both segmentation and optional independent paging, said system comprising:
   a) a linear address generator adapted to calculate a calculated linear address based on processing the entire virtual address;
   b) a physical address generator, coupled to the linear address generator, adapted to generate an actual physical page frame based on processing all of said calculated linear address; and
   c) a second memory storing at least one speculative physical page frame associated with the virtual address;
   wherein the speculative physical page frame is compared to the actual physical page frame to determine if the speculative physical page frame is valid.

8. The system of claim 7, wherein said second memory also includes a field for indicating whether said at least one speculative physical page frame is valid.

9. The system of claim 7, wherein said second memory includes a plurality of speculative physical page frames corresponding to a plurality of previously translated virtual addresses.

10. A system for performing address translation for a virtual address to physical address translation within a processor that employs both segmentation and optional independent paging, said system comprising:
    a) a linear address generator adapted to calculate a first calculated linear address based on processing an entire first virtual address;
    b) a physical address generator, coupled to the linear address generator, adapted to generate an actual first physical address based on processing all of said calculated linear address; and
    c) an adder for calculating a first partial calculated linear address based on processing only a portion of said entire first virtual address;
    wherein said first partial calculated linear address further is used by the system to initiate a fast memory access to a data cache before said actual first physical address is generated by the physical address generator.

11. The system of claim 10, wherein said adder is separate from a linear address generator adder used to compute said first calculated linear address.

12. The system of claim 10, wherein said first partial calculated linear address is calculated by a lower order portion of a linear address generator adder that is also used to compute said first calculated linear address.

13. A system for performing address translation for a virtual address to physical address translation within a processor that employs both segmentation and optional independent paging, said system comprising:
    a) a linear address generator adapted to calculate a first calculated linear address based on processing an entire first virtual address;
    b) a physical address generator, coupled to the linear address generator, adapted to generate a first physical address based on processing all of said calculated linear address; and
    c) a first memory storing partial physical address information associated with said first virtual address;
    d) a comparator which determines if a second physical address created by a fast address translation of a second virtual address is valid by checking said partial physical address information against a corresponding portion of a complete translation of said second physical address.

14. The system of claim 13, wherein said partial physical address information and said corresponding portion are page frames.

15. The system of claim 13, wherein said second physical address is used for a memory access if said fast address translation is not valid.

* * * * *

US006813699C1

(12) INTER PARTES REEXAMINATION CERTIFICATE (0116th)
United States Patent
Belgard

(10) Number: US 6,813,699 C1
(45) Certificate Issued: Nov. 24, 2009

(54) SPECULATIVE ADDRESS TRANSLATION FOR PROCESSOR USING SEGMENTATION AND OPTIONAL PAGING

(75) Inventor: Richard Belgard, Saratoga, CA (US)

(73) Assignee: Transmeta Corporation, Santa Clara, CA (US)

Reexamination Request:
No. 95/000,275, Jun. 18, 2007

Reexamination Certificate for:
Patent No.: 6,813,699
Issued: Nov. 2, 2004
Appl. No.: 10/166,432
Filed: Jun. 10, 2002

Related U.S. Application Data

(63) Continuation of application No. 09/757,439, filed on Jan. 10, 2001, now Pat. No. 6,430,668, which is a continuation of application No. 08/905,356, filed on Aug. 4, 1997, now Pat. No. 6,226,733, which is a continuation of application No. 08/458,479, filed on Jun. 2, 1995, now Pat. No. 5,895,503.

(51) Int. Cl.
*G06F 12/10* (2006.01)

(52) U.S. Cl. .................. 711/213; 711/203; 711/204; 711/205; 711/206; 711/207; 711/209; 711/220

(58) Field of Classification Search ................ None
See application file for complete search history.

(56) References Cited

U.S. PATENT DOCUMENTS

| | | |
|---|---|---|
| 3,781,808 A | 12/1973 | Ahearn et al. |
| 4,084,225 A | 4/1978 | Anderson et al. |
| 4,128,875 A | 12/1978 | Thurber et al. |
| 4,400,774 A | 8/1983 | Toy |
| 4,897,783 A | 1/1990 | Nay |
| 4,926,323 A | 5/1990 | Baror et al. |
| 5,165,028 A | 11/1992 | Zulian |
| 5,255,377 A | 10/1993 | Feldman |
| 5,335,333 A | 8/1994 | Hinton et al. |
| 5,423,014 A | 6/1995 | Hinton et al. |
| 5,442,775 A | 8/1995 | Whitted, III et al. |
| 5,517,651 A | 5/1996 | Huck et al. |
| 5,530,824 A | 6/1996 | Peng |
| 5,577,219 A | 11/1996 | Timko et al. |
| 5,583,806 A | 12/1996 | Widigen et al. |
| 5,590,295 A | 12/1996 | Deosaran et al. |
| 5,596,739 A | 1/1997 | Kane et al. |
| 5,617,554 A | 4/1997 | Alpert et al. |
| 5,623,619 A | 4/1997 | Witt |
| 5,652,872 A | 7/1997 | Richter et al. |
| 5,768,575 A | 6/1998 | McFarland et al. |
| 5,860,154 A | 1/1999 | Abramson et al. |
| 5,878,245 A | 3/1999 | Johnson et al. |
| 5,881,275 A | 3/1999 | Peleg et al. |
| 5,895,503 A | 4/1999 | Belgard |
| 5,900,022 A | 5/1999 | Kranich |

(Continued)

FOREIGN PATENT DOCUMENTS

EP 0 668 565 A1 8/1995

OTHER PUBLICATIONS

U.S. Appl. No. 10/979,499, Belgard.
Margulis, "i860 Microprocessor Internal Architecture," Microprocessors and Microsystems, vol. 14, No. 2, pp. 89–96 (Mar. 1990).

(Continued)

*Primary Examiner*—Ovidio Escalante

(57) ABSTRACT

An improved address translation method and mechanism for memory management in a computer system is disclosed. A segmentation mechanism employing segment registers maps virtual addresses into a linear address space. A paging mechanism optionally maps linear addresses into physical or real addresses. Independent protection of address spaces is provided at each level. Information about the state of real memory pages is kept in segment registers or a segment register cache potentially enabling real memory access to occur simultaneously with address calculation, thereby increasing performance of the computer system.

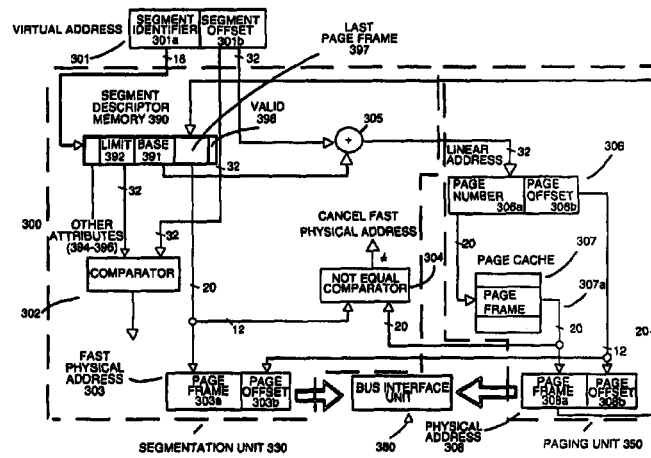

U.S. PATENT DOCUMENTS

| | | | |
|---|---|---|---|
| 5,960,466 | A | 9/1999 | Belgard |
| 5,961,580 | A | 10/1999 | Mahalingaiah |
| 6,226,733 | B1 | 5/2001 | Belgard |
| 6,240,424 | B1 | 5/2001 | Hirata |
| 6,430,668 | B2 | 8/2002 | Belgard |

OTHER PUBLICATIONS

McGeady, "The i960CA SuperScalar Implementation of the 80960 Architecture," IEEE, pp. 232–240 (1990).

Popescu et al, "The Metaflow Architecture," IEEE Micro, vol. 11, No. 3, pp. 10–13, 63–73 (Jun. 1991).

Intrater et al, "A Superscalar Microprocessor," IEEE Proceedings of the 17th Convention of Electrical & Electronics Engineers in Israel, pp. 267–270 (Mar. 1991).

Melear, "The Design of the 88000 RISC Family," IEEE Micro, vol. 9, No. 2, pp. 26–38 (Apr. 1989).

Colwell et a.l, "A VLIW Architecture for a Trace Scheduling Compiler," Proceedings of the 2nd International Conference on Architectural Support for Programming Languages and Operating Systems, pp. 180–192 (Oct. 1987).

Slater, Micheal, "AMD's K5 Designed to Outrun Pentium," Microprocessor Report, vol. 8, No. 14, pp. 1–7 (Oct. 24, 1994).

Transmeta Corporation's Responses to Intel Corporation's First Set of Interrogatories (NoS. 1–20), *Transmeta Corp.* v. *Intel Corp.*, Case No. 06–633 (GMS), District of Delaware, pp. 1–7, 41 and exhibits 2, 3, 4, 5 and 10.

Hennessey and Patterson, "Computer Architecture A Quantitative Approach," pp. 432–497 (2nd Ed. 1996).

Duncan, R., "Application Development Using OS/2.20's Memory Management," PC Magazine, vol. 9, No. 14, pp. 435–440, Aug. 1990.

Bowen, et al, "A Virtual Memory Translation Mechanism to Support Checkpoint and Rollback Recovery," ACM, pp. 890–899, 1991.

Carter, et al "Hardware Support for Fast Capability–based Addressing,"ACM, pp. 319–327, 1994.

Denning, P., "Virtual Memory," Computing Surveys, vol. 2, No. 3, pp. 153–189, Sep. 1970.

Lai et al, "A Memory Management Unit and Cache Controller for the MARS system," IEEE, pp. 200–208.

Peitrek, M., "Understanding Windows 95 Memory Management," Microsoft Systems Journal, vol. 10, No. 4, pp. 19–32, Apr. 1995.

Taylor et al, "The TLB Slice—A Low–Cost High–Speed Address Translation Mechanism," IEEE, pp. 355–363, 1990.

Wood et al, "An In–Cache Address Translation Mechanism," IEEE, pp. 358–365, 1986.

Teller, et al, "TLB Consistency on Highly–Parallel Shared–Memory Multiprocessors," IEEE, pp. 184–193, 1988.

Intel Corporation's Responses to Transmeta's First Set of Interrogatories to Intel Corporation (NoS. 1–24), *Transmeta Corp* v. *Intel Corp.*, Case No. 06–633 (GMS), District of Delaware.

Intel Corporation's Answer, Affirmative Defenses and Counterclaims to Transmeta's First Amended Complaint, *Transmeta Corp.* v. *Intel Corp..*, Case No. 06–633 (GMS), District of Delaware.

Chiueh et al., "Eliminating the Address Translation Bottleneck for Physical Address Cache," Proceedings of the fifth international conference on Architectural Support for Programming Languages and Operating Systems, pp. 137–148, Oct. 1992.

King, A., Inside Windows 95, Microsoft Pr, pp. 45–54 Oct. 1994.

Plambeck, K. "Concepts of Enterprise Systems Architecture/370," IBM Systems Journal, vol. 28, No. 1, pp. 39–61, 1989.

Hua, K. et al., "Early Resolution of Address Translation in Cache Design," Proceedings of the 1990 IEEE International Conference on Computer Design: VLSI in Computers and Processors, pp. 408–412, Sep. 1990.

Dally, W., "A Fast Translation Method for Paging on Top of Segmentation", IEEE Trans. On Computers, vol. 41, No. 2, pp. 247–250, Feb. 1992.

Austin et al, "Streamlining Data Cache Access with Fast Address Calculation," In 22nd International Symposium on Computer Architecture, 1995; 12 pages, Jun. 22, 1995.

Chen et al, "A Simulation Based Study of TLB Performance," In Proc. 19th ISCA.ACM, 1992, 32 pages.

Request for Ex Parte Reexamination in U.S. Appl. No. 5,895,503 (Jun. 15, 2007).

Order Granting Ex Parte Reexamination in U.S. Appl. No. 5,895,503 (Aug. 16, 2007).

File History of U.S. Appl. No. 5,960,466.

File History of U.S. Appl. No. 10/979,499.

Request for Ex Parte Reexamination in U.S. Pat. No. 6,226,733 (Jun. 21, 2007).

Order Granting Ex Parte Reexamination in U.S. Pat. No. 6,226,733 (Sep. 1, 2007).

Request for Inter Partes Reexamination in U.S. Pat. No. 6,430,668 (Jun. 8, 2007).

Order Granting Inter Partes Reexamination in U.S. Pat. No. 6,430,668 (Aug. 22, 2007).

Office Action in Inter Partes Reexamination in U.S. Pat. No. 6,430,668 (Nov. 20, 2007).

Response to Office Action in Inter Partes Reexamination in U.S. Pat. No. 6,430,668 (Jan. 18, 2008).

Transmeta Corporation's Opening Claims Construction Brief, *Transmeta Corp* v. *Intel Corp.*, Case No. 06–633 (GMS), District of Delaware.

Intel Corporation's Opening Claims Construction Brief, *Transmeta Corp.* v. *Intel Corp.*, Case No. 06–633 (GMS), District of Delaware.

Maddock et al, "Hardware Address Relocation for Variable–Length Segments," IBM Technical Disclosure Bulletin, 23:11; pp. 5186–5187, Apr. 1981.

"Multics Processor Manual including Addendums A and B," Honeywell Information Systems; 1979–82.

File history of U.S. Pat. No. 5,321,836.

File history of U.S. Pat. No. 4,972,338.

"DPS–8 Assembly Instructions," Honeywell Corporation, Apr. 1980, Chapters 3 and 5.

"Intel Microprocessors," vol. 1, Intel Corporation, 1993, pp. 2–229 to 2–287.

"U5S 4886 Green CPU," United Microelectronics Corporation, 1994–95, pp. 3–1 to 3–26.

Hennessey and Patterson, "Computer Architecture A Quantitative Approach," pp. 432–497 (1st Ed. 1990).

Organick, Elliott, "The Multics System", 1972, pp. 6–7, 38–51.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 and 13–15 is confirmed.

Claim 10 is determined to be patentable as amended.

Claims 11–12, dependent on an amended claim, are determined to be patentable.

10. A system for performing address translation for a virtual address to physical address translation within a processor that employs both segmentation and optional independent paging, said system comprising:

a) a linear address generator adapted to calculate a first calculated linear address based on processing an entire first virtual address;

b) a physical address generator, coupled to the linear address generator, adapted to generate an actual first physical address based on processing all of said calculated linear address; and c) an adder for calculating a first partial calculated linear address based on processing only a portion of said entire first virtual address;

wherein said first partial calculated linear address further is used by the system to *generate a speculative memory address by combining the partial linear address with physical address information obtained from a prior memory address generation, and wherein the system* [initiate] initiates, *based on the speculative memory address,* a fast *speculative* memory access to a data cache before said actual first physical address is generated by the physical address generator.

* * * * *